Figure 1:
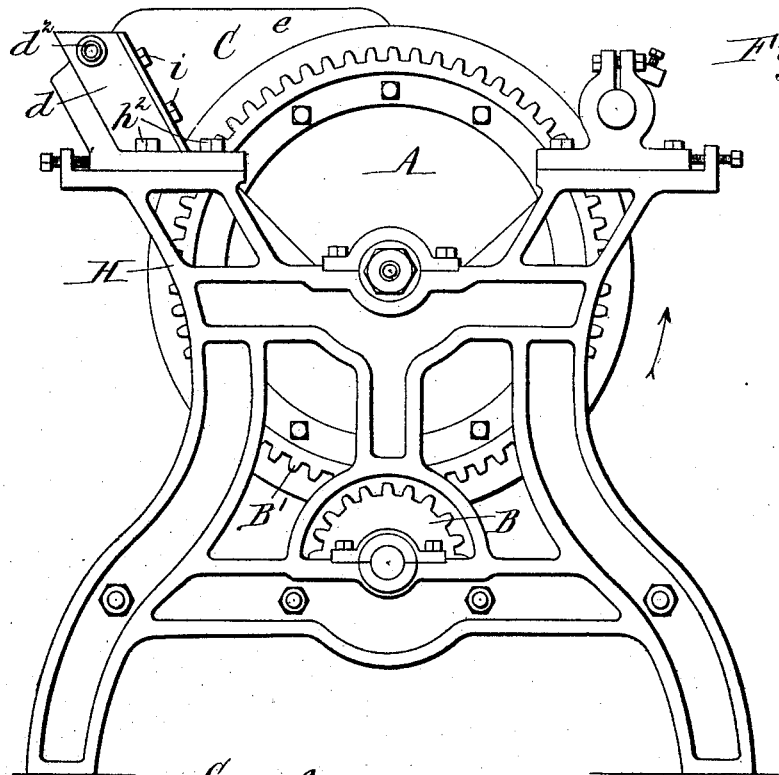

No. 765,343. PATENTED JULY 19, 1904.
J. A. JUST.
PROCESS OF EVAPORATING LIQUIDS.
APPLICATION FILED AUG. 31, 1903.
NO MODEL.

Witnesses. John A. Just
Inventor.
By Wilhelm Bonner
Attorneys.

No. 765,343.

Patented July 19, 1904.

UNITED STATES PATENT OFFICE.

JOHN A. JUST, OF PULASKI, NEW YORK.

PROCESS OF EVAPORATING LIQUIDS.

SPECIFICATION forming part of Letters Patent No. 765,343, dated July 19, 1904.

Application filed August 31, 1903. Serial No. 171,375. (No specimens.)

*To all whom it may concern:*

Be it known that I, JOHN A. JUST, a citizen of the United States, and a resident of Pulaski, in the county of Oswego and State of New York, have invented a new and useful Improvement in Methods of Evaporating Liquids, of which the following is a specification.

This invention relates to the method of evaporating solutions or liquids containing organic or other substances in solution or suspension by subjecting the liquid in a thin film to a high degree of heat, usually above 212° Fahrenheit, the temperature depending somewhat upon the nature of the liquid and other considerations. This method is usually practiced by feeding the liquid in a thin film upon a steam-heated rotary cylinder, from the surface of which the dry or nearly dry film is removed by a scraper in thin sheets or flakes, which can be readily reduced to powder. In some cases the liquid is fed upon two opposing steam-heated cylinders, which make contact with each other and rotate in the proper direction to draw out the liquid from the contacting portions of the cylinders in two films, one adhering to each cylinder. In practicing this method of evaporation, whether on a single or a double cylinder evaporator, it is sometimes found that the film becomes hard or glazed on its surface. When this occurs, the evaporation does not proceed as rapidly as desirable, and this produces various objectionable results, particularly when the liquid operated upon is a delicate and complex liquid like milk, skim-milk, buttermilk, whey, or a mixture of these liquids with farinaceous or other substances used as food products, or a solution of casein.

In order to simplify this description, I will explain my invention more particularly as applied to milk, it being understood, however, that it may also be employed for the evaporation of many other liquids.

When milk, whether full milk or skim-milk, is subjected in a thin film to a high degree of heat by contact with a surface heated to a temperature of from 212° to 270° Fahrenheit, the water contained in the milk forms almost instantaneously a steam cushion on the heated surface, and the steam escaping from the boiling film carries off the heat usually so rapidly that no substantial change occurs in the solid constituents of the milk, the casein remaining in a soluble form and the milk-sugar remaining unchanged. In so evaporating milk for preserving it in dry form it is of the utmost importance to apply sufficient heat to effectually sterilize the resultant dry product; but it is equally important to prevent the heat from reaching that point at which the casein, milk-sugar, salts, &c., undergo a change, either physically or chemically. When the heat rises too high in the film, the casein is rendered more or less insoluble, the product assumes a yellowish or brownish tinge, resulting probably from a partial oxidation and a partial caramelization of the milk-sugar, either or both, and the flavor and taste are impaired. When a tough or glazed surface is formed on the film, the necessary rapid escape of steam from the film is prevented, and this causes an overheating of the film, whereby the properties of the resulting product are impaired as to its solubility, flavor, color, &c., in the case of milk, mainly by the formation of more or less insoluble casein and a greater or less change in the milk-sugar.

The object of this invention is to avoid this difficulty and to carry on the process in such manner that enough heat can be applied to the film to drive off the moisture quickly and to thoroughly sterilize the product, while the heat is prevented from rising to the point at which the physical or chemical conditions of the solid ingredients contained in the liquid are changed, so that as the result of the treatment a dry product is obtained which can be kept for a long time without deterioration, which contains the solid ingredients unaltered, and which produces by the addition of a proper amount of water a liquid closely resembling in properties the original liquid which was evaporated. This result is obtained by subjecting the film to be evaporated to the necessary high degree of heat on one side and to a cooling agent on the opposite side, so that the cooling agent acting upon the outer side or surface of the film prevents the formation of an impervious skin or glazed surface on the film and keeps the surface in an open or porous condition, which permits of the rapid escape of the steam or vapor and prevents overheating of the material and the injurious results arising therefrom.

The accompanying drawings illustrate an apparatus which is suitable for practicing my invention; but I do not wish to limit myself to this particular apparatus.

Figure 2:
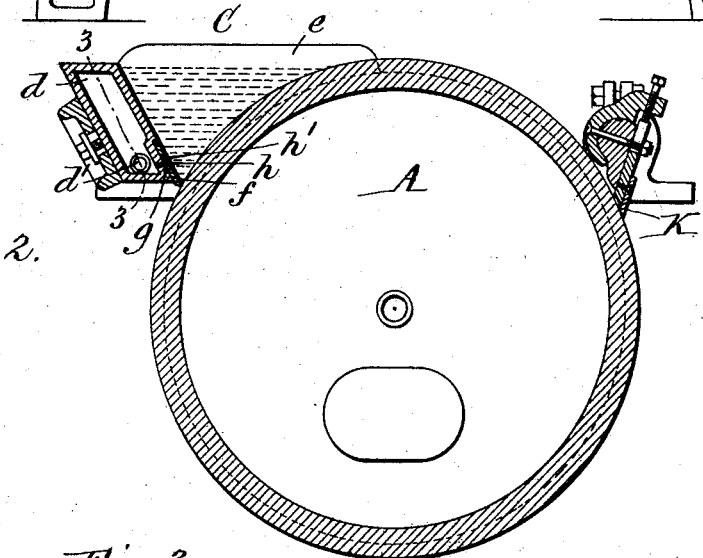
Figure 3:
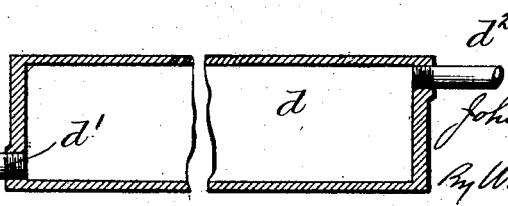

Figure 1 is an end elevation of the apparatus. Fig. 2 is a vertical cross-section of the same. Fig. 3 is a longitudinal section through the cooling-chamber in line 3 3, Fig. 2.

Like letters of reference refer to like parts in the several figures.

A represents a steam-heated evaporating-cylinder of well-known construction provided with the usual means for supplying steam to the interior of the cylinder and removing the water of condensation therefrom.

B B' represent the gear-wheels for rotating the cylinder slowly in the direction of the arrow, Fig. 1. The steam is supplied to the cylinder under the proper pressure to produce the desired degree of heat at the surface of the cylinder.

C represents the feed hopper or receptacle, which receives the liquid or semiliquid to be evaporated and which is arranged adjacent to the upper portion of the cylinder on the descending side thereof. The longitudinal or front wall of this feed-hopper consists of a hollow chamber $d$, through which a cooling agent—for instance, water—is caused to flow, the chamber being provided with an inlet-pipe $d'$ and an outlet-pipe $d^2$.

$e$ represents the end plates of the feed-hopper, which are fitted with their lower sides against the cylinder. The lower edge of the cooling-chamber $d$, by which it bears against the surface of the cylinder, is preferably formed by a blade $f$, which is secured to the chamber. The latter is adjustable toward and from the cylinder on an inclined support $g$ by screws $h$ passing through slots $h'$ in the support, and the latter is adjustably secured to the stationary end frames H by screws $h^2$ passing through slots, so that the thickness of the film can be nicely regulated. The end plates $e$ are adjustable on the chamber $d$ toward and from the cylinder by screws $i$ passing through slots.

K represents the usual scraper by which the dried material is removed from the surface of the cylinder.

The liquid to be evaporated passes from the lower end of the feed-hopper in the form of a thin film through the narrow space between the highly-heated cylinder and the cooling-chamber. This thin film is acted upon at the moment of its formation on one side by the highly-heated surface of the cylinder and on the other side by the cooled surface of the cooling-chamber. The cooling of the outer side of the film prevents the formation of a skin or glazed surface thereon and insures the formation of an open or porous film from which the generated steam or vapor can readily escape, and which is therefore in no danger from becoming overheated during its subsequent travel with the heated cylinder. The cooling of the outer wall of the narrow throat in which the film is formed prevents the adhesion of material to this wall, and so assists in producing a film of uniform thickness on the evaporating-cylinder, whereby the danger of overheating is further reduced, as overheating is liable to occur, at least in parts of the film, when the film is of uneven thickness.

The body of liquid or semiliquid contained in the feed-hopper may be heated to the boiling-point by contact with the cylinder and is in that case concentrated to a greater or less extent before it is formed into a film. The cooling effect of the cooling-chamber upon this body of liquid does not materially interfere with this operation.

In applying my improved process to milk or milk derivatives a dry product is obtained which contains the solid milk ingredients in substantially unaltered form, although the product is thoroughly sterilized, and in which the original color and flavor are preserved, so that upon adding water to the dry product a liquid is produced which closely resembles milk in taste, flavor, nutritive value, and digestibility.

I claim as my invention—

1. The method of evaporating a liquid or semiliquid in a film which consists in subjecting the film to the action of a heated evaporating-surface on one side and to the action of a cooled surface on the opposite side.

2. The method of evaporating a liquid or semiliquid in a film which consists in subjecting the film during its formation to the action of a heated evaporating-surface on one side and to the action of a cooled surface on the opposite side.

Witness my hand this 28th day of August, 1903.

JOHN A. JUST.

Witnesses:
A. M. WALKER,
LIZZIE DARLING.